US008315567B2

(12) United States Patent
Rigge

(10) Patent No.: US 8,315,567 B2
(45) Date of Patent: Nov. 20, 2012

(54) METHOD AND SYSTEM FOR WIRELESS COMMUNICATION WITH AN INTEGRATED CIRCUIT UNDER EVALUATION

(75) Inventor: Lawrence Allen Rigge, Emmaus, PA (US)

(73) Assignee: Agere Systems Inc., Allentown, PA (US)

( * ) Notice: Subject to any disclaimer, the term of this patent is extended or adjusted under 35 U.S.C. 154(b) by 1931 days.

(21) Appl. No.: 10/672,656

(22) Filed: Sep. 26, 2003

(65) Prior Publication Data

US 2005/0070226 A1    Mar. 31, 2005

(51) Int. Cl.
*H04B 7/00* (2006.01)
*H01Q 1/40* (2006.01)
(52) U.S. Cl. .................................... 455/41.3; 343/873
(58) Field of Classification Search ............... 455/522, 455/66, 90.3, 41.3, 466, 333, 217, 41.2; 324/500; 235/492; 326/38; 705/1; 343/873, 700
See application file for complete search history.

(56) References Cited

U.S. PATENT DOCUMENTS

| | | | | |
|---|---|---|---|---|
| 6,492,897 B1* | 12/2002 | Mowery, Jr. | .................. | 455/522 |
| 6,577,157 B1* | 6/2003 | Cheung et al. | .................. | 326/38 |
| 6,659,356 B2* | 12/2003 | Kashima | .................... | 235/492 |
| 6,942,157 B2* | 9/2005 | Nozawa et al. | ................ | 235/492 |
| 7,050,017 B2* | 5/2006 | King et al. | ..................... | 343/873 |
| 2002/0183009 A1* | 12/2002 | Cruz-Albrecht et al. | ........ | 455/66 |
| 2002/0196029 A1* | 12/2002 | Schmidt | ........................ | 324/500 |
| 2004/0097246 A1* | 5/2004 | Welch | ........................... | 455/466 |
| 2004/0123193 A1* | 6/2004 | Gass | ............................. | 714/724 |
| 2004/0215471 A1* | 10/2004 | Tamagno et al. | ................. | 705/1 |
| 2004/0266363 A1* | 12/2004 | Richman | ...................... | 455/90.3 |

OTHER PUBLICATIONS

U.S. Appl. No. 10/602,539, filed Jun. 24, 2003, Richman.
Foerster et al., "Ultra-Wideband Technology for Short- or Medium-Range Wireless Communications," Intel Technology Journal Q2 (2001).

* cited by examiner

*Primary Examiner* — Kiet Doan
(74) *Attorney, Agent, or Firm* — Ryan, Mason & Lewis, LLP

(57) ABSTRACT

A method and apparatus are provided for wireless communication between an integrated circuit device and a monitoring station. Each integrated circuit device has one or more antennas that permit wireless communication with an external monitoring station. A signal destined for an integrated circuit device is transmitted by the monitoring station using an associated antenna. An antenna associated with the destination integrated circuit receives the transmitted signal. The antenna (s) may be embodied, for example, as pins that are external to the integrated circuit device, or printed or etched on the integrated circuit device itself. Greater bandwidth can be achieved, if necessary, by pooling the bandwidth of several antennas.

17 Claims, 2 Drawing Sheets

METHOD AND SYSTEM FOR WIRELESS COMMUNICATION WITH AN INTEGRATED CIRCUIT UNDER EVALUATION

FIELD OF THE INVENTION

The present invention relates generally to the communication with an integrated circuit (IC) device, and more particularly, to techniques for utilizing wireless technology to communicate with an IC device being evaluated, tested, debugged, configured or otherwise monitored or controlled.

BACKGROUND OF THE INVENTION

Communications with an integrated circuit device have traditionally been accomplished using wired technology, such as printed circuit and multi-wire boards. These technologies require a wired link embedded in or on a board or substrate that physically supports one or more IC devices and possibly other components. The wired link may be comprised of an etched conductive trace or conventional wire embedded in the circuit board. An electrical connection between a terminal on the IC device and a via or pad connected to the wire trace facilitates the transmission of a signal to or from the IC device. While such interconnections are the commonly employed method for communicating with IC devices, they incur a number of problems that impact the cost and performance of the IC devices.

The wire traces and associated solder joints of both cited technologies are costly to manufacture and are susceptible to failure both during and after manufacturing. In addition, when wire traces are of a relatively long length, they generate cross-talk between signals and cause additional signal loss due to signal reflections and the resistance of the wire trace. This limits the attainable bandwidth of the interconnecting signals and, thus, the bandwidth of the IC devices. In addition, the traces and terminal connections also consume space on the board or substrate that could otherwise be utilized for supporting a larger number of IC devices or eliminated to create smaller products. As a result, only a small number of pins can be devoted to testing and debugging, so that the amount of system or internal chip data that can be monitored/driven is limited, typically to a few mega-bits-per-second (MBPS), which is generally considered insufficient. This is especially limiting when trying to evaluate or debug systems in real time operating conditions.

These wired technologies are also utilized for system-level communications, i.e., between self-contained devices, such as computers, peripherals, network routers, Original Equipment Manufacturer (OEM) products and sub-assemblies. In addition, wireless technologies, such as the IEEE 802.11 standard for wireless local area networks or the Bluetooth standard, are commonly used for communication among these types of system-level devices. See, for example, "Information Technology: Telecommunications and Information Exchange Between Systems—Local and Metropolitan Area Networks—Specific Requirements," ANSI/IEEE Standard 802.11 (1999), incorporated by reference herein. Wireless links, however, have been traditionally restricted to this system-level domain due to their high cost, large size, and relatively low bandwidth compared to wired solutions. The conventional view has been that wireless links are too slow and expensive to compete with wired solutions for relatively short distances. In view of the foregoing, a need exists for a method and apparatus for wireless communication with an IC device being evaluated, tested, debugged, configured or otherwise monitored or controlled.

SUMMARY OF THE INVENTION

Generally, a method and apparatus are disclosed for wireless communication between an integrated circuit device and a monitoring station. Each integrated circuit device has one or more antennas that permit wireless communication with one or more external monitoring stations. A signal destined for an integrated circuit device is transmitted by the monitoring station using an associated antenna. An antenna associated with the destination integrated circuit receives the transmitted signal. The antenna(s) may be embodied, for example, as pins that are external to the integrated circuit device, or printed or etched on the integrated circuit device itself. The present invention provides for wireless transmission and reception between an integrated circuit device and an external monitoring station. A plurality of channels may be achieved using known multiplexing techniques, such as time division multiplexing or the transmission of multiple signals at different carrier frequencies or on different antennas (spatial multiplexing). In addition, greater bandwidth can be achieved, if necessary, by pooling the bandwidth of several antennas, in a similar manner to bus arrangements, such as the PCI Express standard.

A more complete understanding of the present invention, as well as further features and advantages of the present invention, will be obtained by reference to the following detailed description and drawings.

DETAILED DESCRIPTION

Wireless communications with an IC device have traditionally been restricted to the domain of system-level communications due to the high cost, large size and relatively low bandwidth compared to wired solutions. The present invention recognizes that existing and emerging wireless technology can be exploited to permit wireless communication with an integrated circuit device being evaluated, for example, by a test station.

Figure 1:
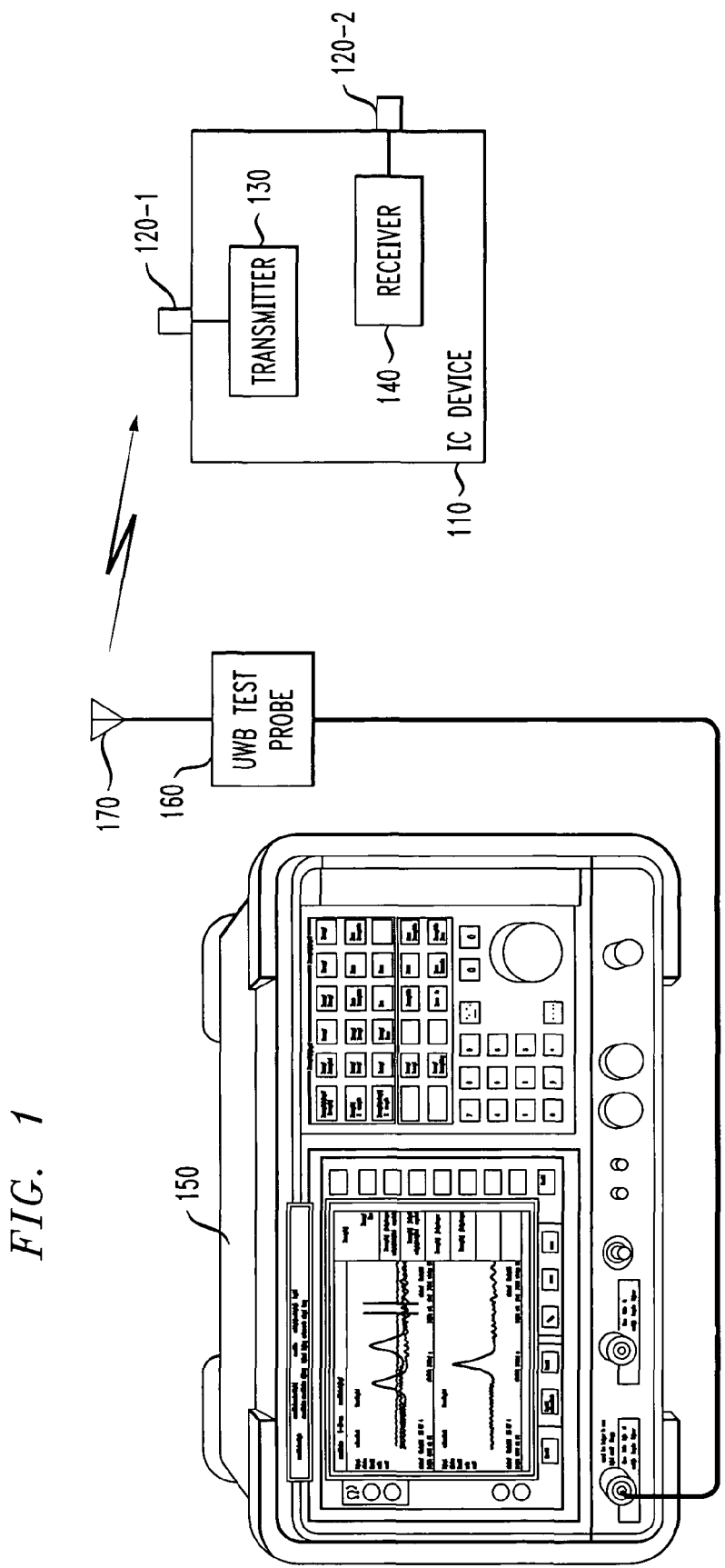
FIG. 1 is a schematic block diagram of an integrated circuit device and an external test station interconnected by a wireless link in accordance with the present invention.

FIG. 1 shows a schematic block diagram of an exemplary wireless solution in accordance with the present invention for communicating with an IC device 110 being evaluated, for example, by a monitoring station 150. The integrated circuit device 110 may be embodied, for example, as a system on a chip (SOC). The monitoring station 150 may be a test station or any device with a wireless communication capability. The exemplary integrated circuit device 110 comprises one or more antenna 120-1 and 120-2, one or more transmitters 130 and/or one or more receivers 140. The antenna 120 may be embodied, for example, as pins or other electromechanical devices on the IC or printed or etched directly on the IC itself. A signal originating in the test station 150 may be transmitted, for example, via an antenna 170 associated with an optional test probe 160 to the integrated circuit device 110 being evaluated. The transmitted signal is received by receiver 140 via antenna 120-2.

A variety of protocols and technologies can be utilized for the wireless interconnection links, such as IEEE 802.11a, UWB or Bluetooth. In addition, new technologies for ultra-wide bandwidths are being standardized by organizations such as the IEEE, including the IEEE 802.15 Working Group for Wireless Personal Area Networks. For a further discussion of suitable UWB communications, see, for example, J. Foerster et al., "Ultra-Wideband Technology for Short- or Medium-Range Wireless Communications," Intel Technology Journal (2d Quarter, 2001), incorporated by reference herein. All of these technologies are designed for communications between self-contained components, e.g., computers, peripherals, and high-definition televisions. As previously indicated, wireless technologies such as ultra-wideband exhibit extremely high bandwidths at relatively short distances and are thus suitable for communicating with an IC device being evaluated in accordance with the present invention.

A plurality of communication channels may be achieved using known multiplexing techniques, such as time division multiplexing or the transmission of multiple signals at different carrier frequencies or on different antennas. An IC device 110 may receive or transmit a single signal, or may transmit multiple signals at different carrier frequencies. The transmitted signals may be transmitted using one or more antennas 120. Thus, a single antenna 120 may facilitate the transmission of several signals to one or more destination IC devices 110. In addition, greater bandwidth can be achieved, if necessary, by pooling the bandwidth of several antennas, in a similar manner to bus arrangements, such as the PCI Express standard.

Each receiver 140 may receive a single specified carrier frequency, or may be capable of tuning to one or more carrier frequencies to receive one or more transmitted signals. Thus, a single antenna 120 may facilitate the reception of several signals from the transmitting test station 150. In addition, if the transmitted signal is time-division multiplexed, the receiving IC device 110 may demultiplex the transmitted signal to receive one or more channels.

Figure 2:
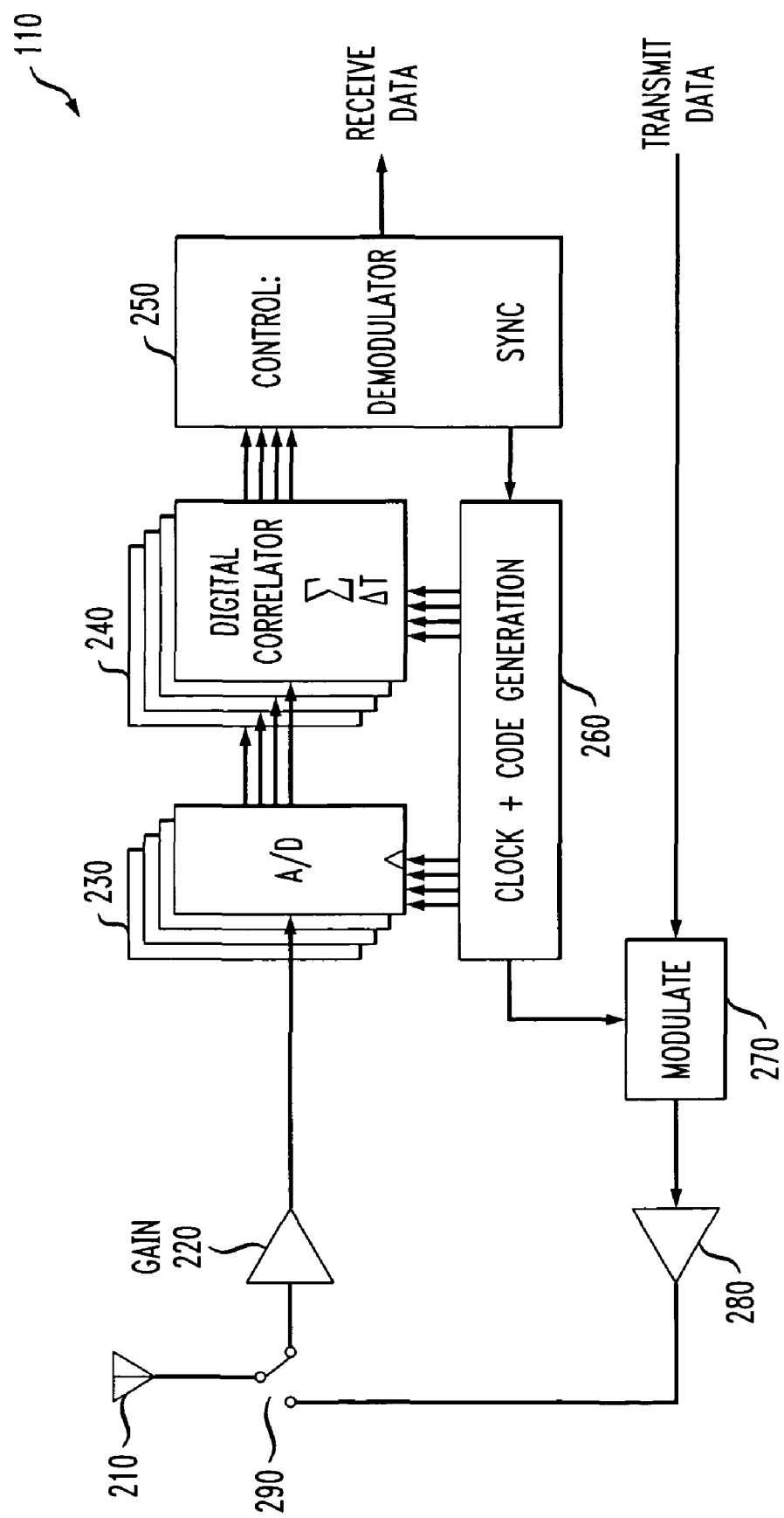
FIG. 2 is a schematic block diagram illustrating the transmit and receive sections of the integrated circuit device of FIG. 1 in further detail.

FIG. 2 is a schematic block diagram of the integrated circuit device 110 of FIG. 1 illustrating exemplary transmit and receive sections 130, 140 in further detail. As shown in FIG. 2, a received signal is received by the antenna 210 and a switch 290 is configured to pass the received signal to the receive section of the integrated circuit device 110. Thus, the received signal is amplified by an amplifier 220 before being converted to a digital signal by an analog-to-digital converter 230. The digital signal is then correlated at stage 240 before being demodulated, if necessary, at stage 250 to produce the recovered signal, Rx data. The clock is recovered from the received data using feedback from the demodulator 250, in a known manner.

As shown in FIG. 2, the transmit section 130 is enabled when the integrated circuit device 110 has data to transmit. The data to be transmitted, Tx data, is modulated onto the appropriate carrier frequency at stage 270 and then amplified at stage 280. The switch 290 is configured to pass the transmit signal from the transmit section of the integrated circuit device 110 to the antenna 210 for wireless communication, for example, to the test station 150 (FIG. 1). It is noted that the shared clock recovery circuit conserves surface area.

Thus, using an exemplary ultra-wideband transceiver, the present invention allows large amounts of data to be transferred between integrated circuit devices and one or more monitoring stations with little overhead and without disrupting normal system operation. In addition, the invention allows the internal operation of highly integrated SOC devices to be accessed. Currently available wireless communication protocols allow data to be transferred at rates exceeding 100 MBPS. The present invention allows dozens of signals inside a high speed SOC device to be easily monitored or updated. Examples include monitoring the raw bit stream from an 802.11g receiver for bit error rate or updating the configuration of a reconfigurable processing device.

Other advantages include the ability to more closely align testing capability with simulation for faster silicon debugging, the ability to inject large quantities of data into the system for testing and validation, and the overall ease of use compared to existing methods. Ease of use is especially important for servicing complex products and direct wireless access to internal operation minimizes repair and service time because thorough diagnostics can be run quickly without opening up the unit, including operating the unit in its normal operating mode.

In one embodiment, a "Wireless JTAG" port makes use of simple ultra-wideband wireless techniques to transfer large amounts of data without the need for numerous I/O pins (as well as using less power and die area), similar to the way JTAG provides access to internal signals via a four pin interface.

It is to be understood that the embodiments and variations shown and described herein are merely illustrative of the principles of this invention and that various modifications may be implemented by those skilled in the art without departing from the scope and spirit of the invention.

I claim:

1. A method for wireless communication between an integrated circuit device and a monitoring station, said method comprising the steps of:
    transmitting a wireless signal from said integrated circuit device to said monitoring station using an antenna associated with said integrated circuit device, wherein said antenna is a pin on said integrated circuit device, and wherein said monitoring station performs one or more of testing, debugging and evaluating said integrated circuit.

2. The method of claim 1, wherein said antenna is incorporated in said integrated circuit device.

3. The method of claim 2, wherein at antenna is printed on said integrated circuit device.

4. The method of claim 1, wherein said signal is transmitted in accordance with an 802.11 wireless standard.

5. The method of claim 1, wherein said signal is transmitted in accordance with an ultra wide band wireless standard.

6. The method of claim 1, wherein said signal is transmitted in accordance with a Bluetooth standard.

7. The method of claim 1, wherein said signal is a test command.

8. The method of claim 1, wherein said signal is a memory pattern to be applied to a memory area on said integrated circuit device.

9. An integrated circuit device, comprising:
    at least one circuit; and
    an antenna for wireless communication with an external monitoring station, wherein said antenna is a pin on said integrated circuit device, and wherein said monitoring station performs one or more of testing, debugging and evaluating said integrated circuit.

10. The integrated circuit device of claim 9, wherein said antenna is incorporated in said integrated circuit device.

11. The integrated circuit device of claim 10, wherein at antenna is printed on said integrated circuit device.

12. The integrated circuit device of claim 9, wherein said signal is transmitted in accordance with an 802.11 wireless standard.

13. The integrated circuit device of claim 9, wherein said signal is transmitted in accordance with an ultra wide band wireless standard.

14. The integrated circuit device of claim 9, wherein said signal is transmitted in accordance with a Bluetooth standard.

15. The integrated circuit device of claim 9, wherein said signal is a test command.

16. The integrated circuit device of claim 9, wherein said signal is a memory pattern to be applied to a memory area on said integrated circuit device.

17. A method for wireless communication between an integrated circuit device and a monitoring station, said method comprising the steps of:

transmitting a wireless signal to said monitoring station from said integrated circuit device using an antenna associated with said integrated circuit device, wherein said antenna is a pin on said integrated circuit device, and wherein said monitoring station performs one or more of testing, debugging and evaluating said integrated circuit.

* * * * *